(No Model.)

P. C. HEINZ.
STEADYING DEVICE FOR PRESSURE GAGES.

No. 440,151. Patented Nov. 11, 1890.

Witnesses.
E. D. Willis.
J. Keese Hallock.

Inventor.
Peter C. Heinz
By Atty's Hallock & Hallock

United States Patent Office.

PETER C. HEINZ, OF WILLIAMSPORT, PENNSYLVANIA.

STEADYING DEVICE FOR PRESSURE-GAGES.

SPECIFICATION forming part of Letters Patent No. 440,151, dated November 11, 1890.

Application filed May 16, 1890. Serial No. 352,036. (No model.)

*To all whom it may concern:*

Be it known that I, PETER C. HEINZ, a citizen of the United States, residing at Williamsport, in the county of Lycoming and State of Pennsylvania, have invented certain new and useful Improvements in Pressure-Gages; and I do hereby declare the following to be a full, clear, and exact description of the invention, such as will enable others skilled in the art to which it appertains to make and use the same.

This invention relates to pressure (or vacuum) gages; and it consists in certain improvements in the construction of the same, as will be hereinafter fully set forth, and pointed out in the claim.

The object of my invention is to prevent vibratory action of the index when the gage is subjected to high degrees of pressure.

Where pressure-gages are used for measuring high degrees of pressure, particularly hydraulic pressure in conduits, it is difficult to prevent great vibratory action of the index. If the valve between the gage and the conduit be opened at all wide, the pointer will be thrown back and forth with great rapidity, and its vibrations will be so wide that it will be impossible to tell what the pressure is, and to make the needle or pointer stand still it is necessary to so nearly close the valve as to have a very minute opening through it. When the valve is thus closely adjusted, wide and temporary changes of pressure in the conduit may occur, which will not be indicated by the gage at all. The reason of this is that the flow of fluid through the valve is so choked and throttled that the gage can have no sensitiveness, particularly where the fluid is at all sluggish in its movement and is comparatively inelastic, such as water or oil.

I have found in using the most perfectly-constructed recording-gages to indicate the pressure in an oil pipe-line that the pressure may vary more than one hundred pounds per square inch for considerable periods of time without changing the course of the recording-pencil if the valve is set so that the pointer will not vibrate violently. I have found that the same gage with my attachment thereon will permit the valve to be wide open without any fluctuation of the pointer and will instantly record the slightest change in pressure.

Figure 1:
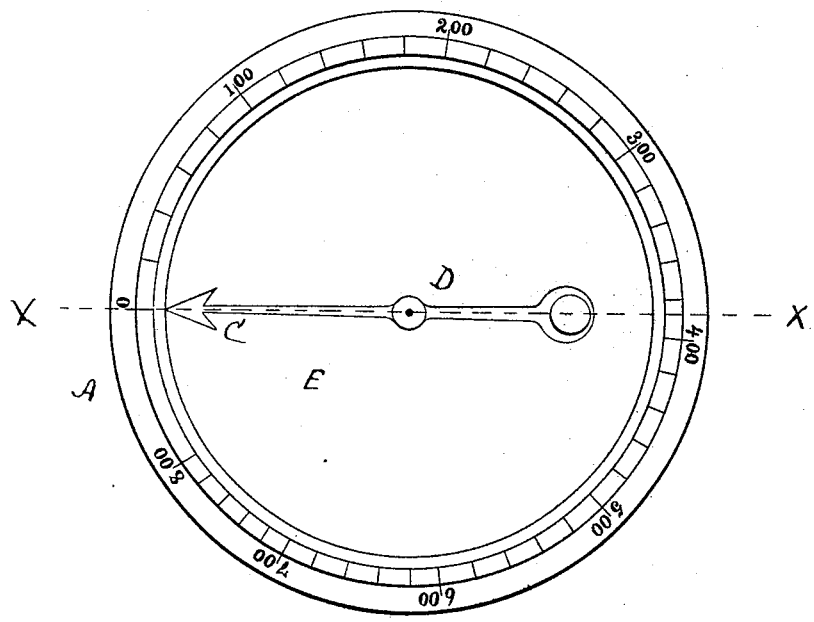
Figure 2:
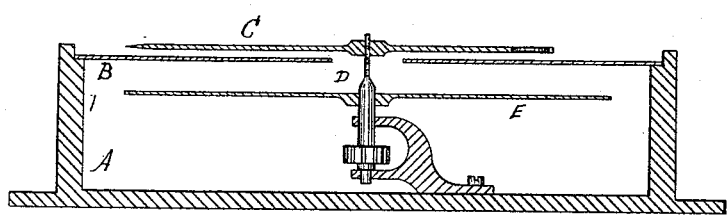

My invention is illustrated in the accompanying drawings, as follows:

Figure 1 is a front view of the face of a pressure-gage. Fig. 2 is a sectional view on the line *x x* in Fig. 1.

Only such of the working parts of the gage are shown as is necessary to illustrate my improvement, and the arrangement of parts is slightly different in the two figures.

A is the shell or case of the gage; B, the dial; C, the pointer; D, the pointer-arbor, and E is my added balance-disk by which the action of the pointer is steadied.

In Fig. 1 the disk C is shown placed outside of the dial and immediately under the pointer, while in Fig. 2 the disk is shown placed within the case back of the disk. If desired, the dial may be marked on the disk D and the pointer be fixed to the frame A. The essential feature is that the disk E be on the arbor D. It may be a plain disk, or it may be a balance-wheel, as desired. Its mechanical action is that of a balance-wheel. It contains a considerable mass of matter, which is evenly distributed about its axis—the arbor D—and while it at no point retards the action of the arbor more than at another its inertia is not so easily overcome as a light needle, and it effectually prevents the undue vibration or quivering when the gage is subjected to full pressure.

What I claim as new is—

In a pressure (or vacuum) gage, the combination, with the arbor D, of a balance-wheel or disk E, mounted on said arbor, substantially as and for the purposes set forth.

In testimony whereof I affix my signature in presence of two witnesses.

PETER C. HEINZ.

Witnesses:
J. H. DICKSON,
W. C. GILMORE.